(12) United States Patent
Zolfonoon et al.

(10) Patent No.: US 8,978,122 B1
(45) Date of Patent: Mar. 10, 2015

(54) SECURE CROSS-TENANCY FEDERATION IN SOFTWARE-AS-A-SERVICE SYSTEM

(71) Applicant: EMC Corporation, Hopkinton, MA (US)

(72) Inventors: Riaz Zolfonoon, Concord, MA (US); Nirav Mehta, Shrewsbury, MA (US); Gareth Richards, Woodstock (GB)

(73) Assignee: EMC Corporation, Hopkinton, MA (US)

( * ) Notice: Subject to any disclaimer, the term of this patent is extended or adjusted under 35 U.S.C. 154(b) by 77 days.

(21) Appl. No.: 13/853,279

(22) Filed: Mar. 29, 2013

(51) Int. Cl.
*H04L 29/00* (2006.01)
*H04L 29/06* (2006.01)

(52) U.S. Cl.
CPC ............ *H04L 63/08* (2013.01); *H04L 63/0815* (2013.01)
USPC .................................................... 726/8; 726/4

(58) Field of Classification Search
CPC ............................ H04L 63/0815; H04L 63/08
USPC ........................................................ 726/4, 8
See application file for complete search history.

(56) References Cited

U.S. PATENT DOCUMENTS

| | | | |
|---|---|---|---|
| 8,271,536 B2 | 9/2012 | Amradkar et al. | |
| 8,271,615 B2 | 9/2012 | Ellison et al. | |
| 8,566,917 B2 | 10/2013 | Vangpat et al. | |
| 2011/0231919 A1* | 9/2011 | Vangpat et al. | 726/8 |
| 2013/0007845 A1* | 1/2013 | Chang et al. | 726/4 |
| 2013/0091547 A1* | 4/2013 | Venkatesh et al. | 726/4 |
| 2013/0111549 A1* | 5/2013 | Sowatskey et al. | 726/3 |
| 2013/0125209 A1* | 5/2013 | Schumacher | 726/4 |
| 2013/0218830 A1* | 8/2013 | Kuruganti et al. | 707/608 |
| 2013/0269017 A1* | 10/2013 | Patil | 726/8 |
| 2014/0013409 A1* | 1/2014 | Halageri | 726/8 |
| 2014/0075501 A1 | 3/2014 | Srinivasan et al. | |
| 2014/0075565 A1* | 3/2014 | Srinivasan et al. | 726/26 |
| 2014/0090037 A1* | 3/2014 | Singh | 726/7 |
| 2014/0123231 A1* | 5/2014 | Low et al. | 726/4 |
| 2014/0156724 A1* | 6/2014 | Said et al. | 709/203 |
| 2014/0208096 A1* | 7/2014 | Brandwine et al. | 713/156 |
| 2014/0215595 A1* | 7/2014 | Prasad et al. | 726/8 |
| 2014/0280595 A1* | 9/2014 | Mani et al. | 709/204 |

* cited by examiner

*Primary Examiner* — Michael Pyzocha
(74) *Attorney, Agent, or Firm* — BainwoodHuang (57) ABSTRACT

In a software-as-a-service system, a federated relationship is established between a first tenant subsystem (host) and a user account on a second tenant subsystem (guest), the federated relationship including visibility controls in the host specifying resources made accessible to an authorized user of the user account. When a guest user accesses the host, an authentication is performed that includes requesting and receiving from the guest a security assertion that the user has been authenticated by the guest as the authorized user. Each tenant subsystem includes mechanisms for authenticating its own users for access control; the cross-tenancy authentication extends this operation to make and accept authentication assertions from other tenants. A second risk-based authentication may be performed for additional confidence, typically based on comparing circumstances for the present access to circumstances for past accesses.

22 Claims, 5 Drawing Sheets

SECURE CROSS-TENANCY FEDERATION IN SOFTWARE-AS-A-SERVICE SYSTEM

BACKGROUND

The invention relates generally to multi-tenant computing systems.

In the computing field, a software-as-a-service (SaaS) model is based on the promise of sharing the cost of computing and administrative resources between many customers (tenants) of a given service. A SaaS environment may offer a service such as storage (Storage-as-a-Service), identity management (ID-as-a-Service), and so on to the customers of the service.

The cost of operation of a SaaS environment is a major concern for service providers. A key factor for reducing this cost is the provider's ability to share resources. However, each customer tenant requires a certain level of isolation from other tenants, for data protection or security in proportion to the level of protection obtainable when an application is hosted on-premises and under control of a customer's IT organization. For example, it may be permissible for a company's public information to be visible to other tenants, whereas the company's employee information must be kept isolated from other tenants.

Thus a key capability of any shared infrastructure is multitenancy. Multitenancy allows various tenants to optimize resource sharing in a SaaS environment while providing sufficient level of isolation among the tenants for data security needs.

SUMMARY

In existing multitenant systems, a natural side effect of providing isolation among tenants is that users provisioned into one tenant (subscribers) have no visibility and no access to the resources managed and offered by the other tenants. For example, in a Storage-as-a-Service environment, a subscriber to tenant A cannot see any of the files and documents stored by tenant B for/by its own subscribers.

While isolation is an essential requirement of a secure multitenant system, there are business scenarios that require users from one tenant to gain access to resources/services of another tenant. One example of this use case is when one tenant (guest) is providing a consulting service to another tenant (host), and under certain conditions needs access to the host tenant's environment. In today's systems this requirement is met by duplicating subscribers from the guest tenant in the host tenancy, i.e., creating user accounts in the host tenancy for the users of the guest tenant organization. As with any duplication of data, this technique adds management overhead such as initial provisioning of the duplicate subscriptions and ongoing maintenance to keep records current and synchronized. In a large and vibrant SaaS community, this problem is exacerbated due to the fact that each tenant may act as host and guest to other tenants in a complex web of many-to-many relationships.

A disclosed technique provides an alternative manner of supporting such business needs in a manner consistent with the isolation requirements of a secure multitenant system. The method includes establishing a federated relationship between a first (host) tenant subsystem and a user account on a second (guest) tenant subsystem, where the federated relationship includes visibility controls in the host tenant subsystem identifying the user account and specifying resources of the host tenant subsystem that are accessible to an authorized user of the user account in the guest tenant subsystem. There is no requirement for, and generally there is not any, duplication of the user account on the host tenant subsystem.

Subsequently during operation when a user of the guest tenant subsystem accesses the resources of the host tenant subsystem, a user authentication is performed in the host tenant subsystem. The authentication includes requesting and receiving from the second tenant subsystem a security assertion that the user has been authenticated by the second tenant subsystem as the authorized user of the user account. Each tenant subsystem already includes mechanisms for authenticating its own users for access control purposes, and thus this cross-tenancy authentication represents a straightforward extension of this operation to make and accept authentication assertions from other tenants. Additionally, a second authentication may be performed which is a risk-based authentication of the user, typically based on comparing information describing circumstances for the present access to historical information describing circumstances for past accesses by the user to the resources. The second authentication provides additional confidence to the host tenant subsystem beyond that provided by the authentication assertion from the guest tenant subsystem.

The technique allows for selective access to host resources by the users of other tenants without the costs and pitfalls associated with duplicating user accounts on the host tenant subsystem. The resource sharing advantages of SaaS organization can be realized without sacrificing security yet still providing for flexible relaxation of security controls to support federation models of business activity.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Secure multitenancy can be thought of as resting on four pillars: Secure Separation, Service Assurance, Availability, and Management. A technique described herein, referred to as Cross Tenancy Federation (CTF), maintains these four pillars while providing policy-based visibility between host and guest tenants based on mutual agreement and consent of both parties. Furthermore, additional security features are provided that enhance and strengthen the trust level between the host and the guest tenants.

CTF incorporates the following key principles:

1. Federated Relationship

CTF enables otherwise isolated host and guest tenants in a multitenant system to establish a controlled relationship using established federation protocols. That is, for example, in a service implementing security assertion markup language (SAML) federation protocol, the host and guest organizations use out of band mechanisms to negotiate their business relationship. Once the agreement is reached, CTF provides technical features for exchange of SAML meta-data between the two tenants. At runtime, when a subscriber from the guest tenancy is attempting to access the host services, a SAML authentication request is sent to the guest tenancy. In this case, the guest tenant acts as an Identity Provider (IdP) and authenticates its own user and responds to the host. SAML is provided as an example only; other security/federation protocols may be employed.

2. Visibility Control

CTF provides a secure mechanism for the host and guest tenants to expose the minimal visibility to each other based on a strict management model. Each tenant acting as a guest may decide to take an explicit action to disclose its unique Tenant ID (TID—assigned by service provider) to other tenants. Alternatively, the exchange of TID may happen out of band between the guest and host tenants as part of their business negotiation. With the guest TID in hand, the host tenant takes explicit management action defined by CTF to initiate the establishment of the cross tenancy with the guest according to the federation mechanism in effect between the two. The visibility controls also enable the guest tenant to control which users or groups of users from the guest tenancy population will be exposed to other (host) tenants.

3. Authentication Control

Since isolation is of paramount importance in a secure multitenant system, CTF provides an additional layer of authentication for guest users who are federated into the host environment. CTF defines a risk-based authentication scheme in which the host tenant defines a secondary authentication policy in addition to the authentication enforced by guest tenant. That is, after a gust user is authenticated by its respective IDP, the system performs a risk analysis based on that user's unique risk profile and history and if necessary imposes a second authentication which is defined according to the host's authentication policy and requirements.

Regarding the four pillars of secure multitenancy mentioned above, CTF meets the Secure Separation and Management requirements by its incorporation of the above features. As for Service Assurance and Availability, CTF operates internal to the boundaries of the service and therefore does not impact the level of service or availability of the overall service.

Figure 1:
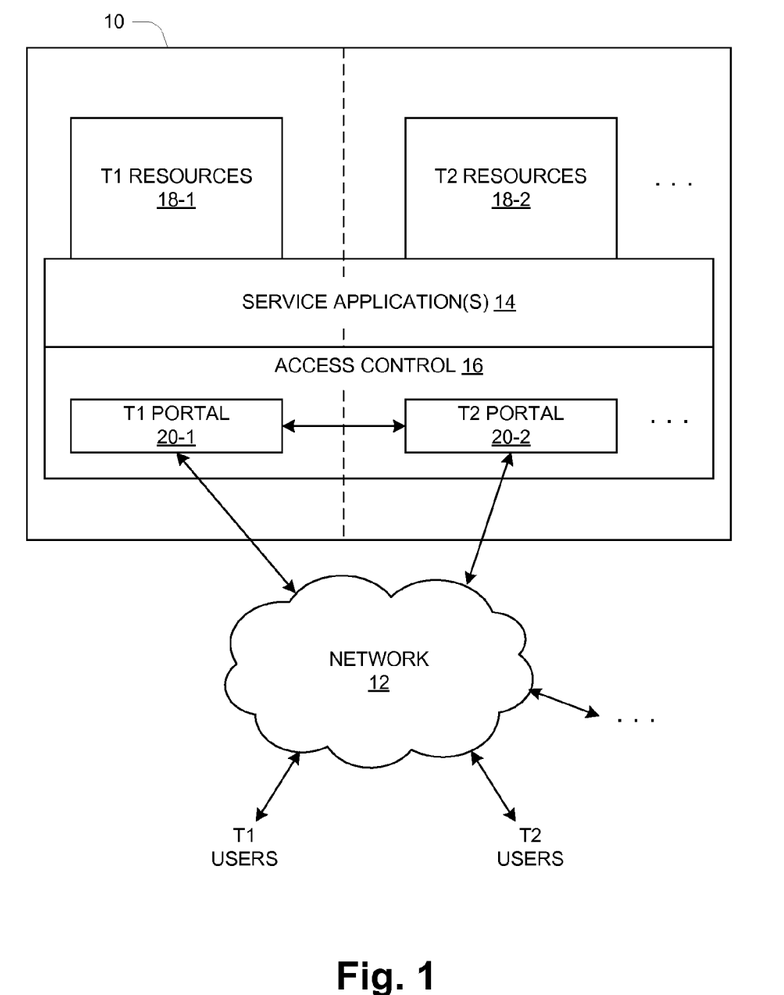
FIG. 1 is a block diagram of a computer system including a software-as-a-service (SaaS) system.

FIG. 1 shows a distributed computer system including a software-as-a-service (SaaS) system 10 coupled to a network 12 by which the users of different tenants (Tx USERS) access the data processing services provided by the SaaS system 10. The SaaS system 10 is a computer system having specialized "multi-tenant" organization that enables it to provide services to multiple tenant organizations in an efficient and yet secure manner. At a high level, this organization includes service applications 14 that are generally shared among the tenants, as well as an access control subsystem 16 that manages use of the service applications 14 by the tenant users. The SaaS system 10 further includes per-tenant structures and functions identified as tenant resources (Tx RESOURCES) 18 and tenant portals (Tx PORTAL) 20. The tenant resources 18 are primarily data resources, i.e., tenant-owned data used by the service applications 14 and generally not shared with other tenants. The tenant portals 20 provide tenant-specific paths of access and use of the service applications 14 using the respective tenant resources 18. As shown, the tenant portals 20 have inter-portal connections 22 providing for communication among them.

Generally in operation, a user of a given tenant (e.g., T1) obtains services by accessing the respective tenant portal 20, for example using a web browser and loading an initial page from the portal 20. The portal 20 engages the user in an authentication process by which the user establishes his/her identity as a T1 user, and then provides a mechanism by which the user can access the service applications 14 and respective tenant resources 18. For example, the portal 20 may maintain an application catalog identifying the service applications 14 available to the tenant users, and display corresponding hyperlinks that a user can select and activate to invoke the service applications 14 accordingly.

In general, the access control subsystem 16 enforces isolation among the different tenants so that each tenant views the SaaS system 10 as a tenant-specific computing resource. This enables multiple tenants to safely share an underlying computing infrastructure, i.e., servers, network devices, power equipment, etc. Major benefits of the SaaS model include cost advantages from such infrastructure sharing, along with "outsourcing" of certain IT maintenance and overhead functions (such as software maintenance) that are generally common across all tenants. Tenant organizations have generally wanted to obtain these benefits while otherwise maintaining operational separation from other organizations, as they would enjoy if they used their own computing infrastructure. Thus the multi-tenant SaaS model has developed and grown along with security techniques that ensure the required isolation of tenant resources 18 to satisfy data security concerns.

As mentioned above, however, there are emerging use cases for selective federation among tenants in a multi-tenant SaaS environment, requiring that a SaaS system effectively defeat or override the default tenant protections in a selective manner to provide federated access. The SaaS system 10 provides mechanisms for secure federation among tenants, as described more fully below. In the context of a federation, users of one tenant (referred to as "guest") are given controlled access to resources 18 of another tenant (referred to as "host"). Federation as described herein can support a variety of use cases such as those mentioned above.

Figure 2:
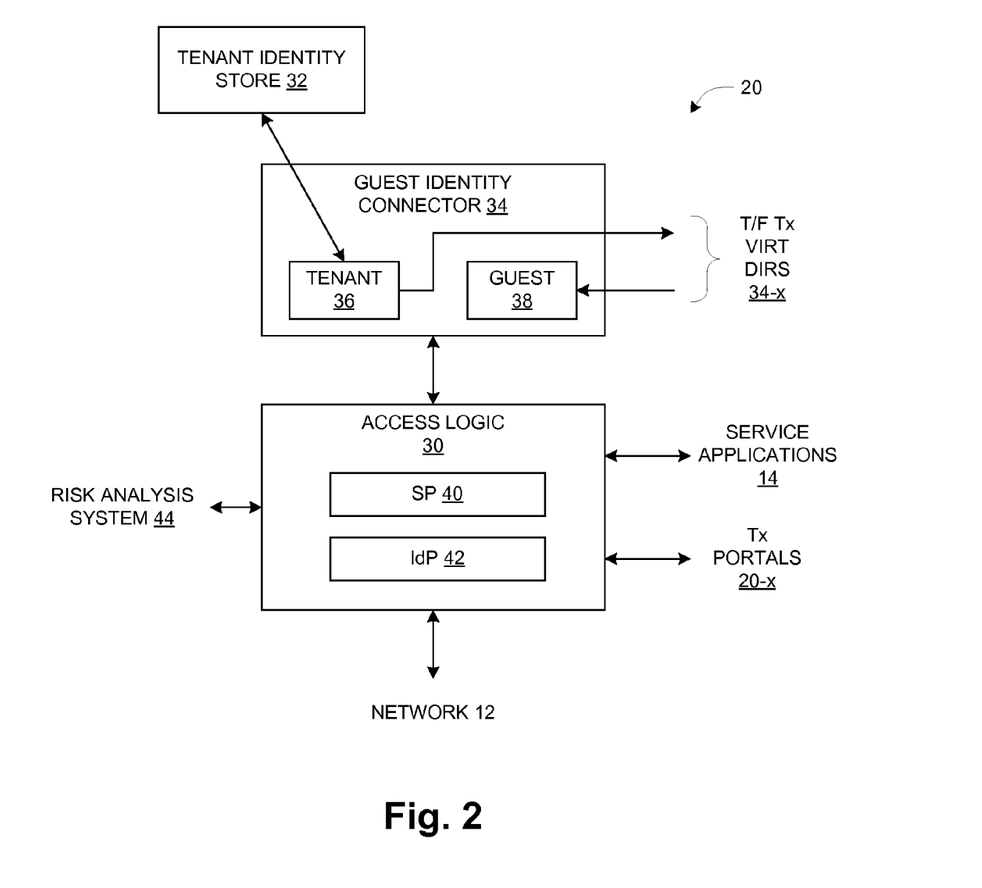
FIG. 2 is a schematic diagram of a tenant portal in a SaaS system.

FIG. 2 illustrates a portal 20. Access logic 30 performs access control as well as certain additional authentication procedures as described more below. In one aspect the portal 20 includes a tenant identity store 32 containing entries for the Tx users of this tenant, with the entries containing password and/or other authentication information as well as access control information describing each user's permissions for accessing the tenant resources 18. In this respect the portal 20 reflects traditional isolation among tenants, as the identity store 32 is specific to the given tenant and does not enable access by users of other tenants as such. As mentioned above, in the past it has been necessary to create separate user accounts in a host tenant system for users of other tenants that are to be given access to the host tenant resources. In this approach, such users effectively become user members of the host tenant, with corresponding entries being created in a tenant directory or similar identity store. As indicated above, this approach suffers the drawbacks of duplication of user accounts across tenants.

To support cross-tenancy federation without requiring such duplication of user accounts, the portal 20 employs a construct shown as a guest identity connector 34. The guest identity connector 34 includes mirroring 36 of the local tenant identity store 32, and to that extent is usable for traditional per-tenant user authentication and access control for users of this tenant. It also provides for sharing directory information among the tenant portals 20 in support of federation. This is indicated by outbound and inbound connections to the virtual directories 34-x of the other portals 20-x. The inbound connections result in guest entries 38 in the local guest identity connector 34 for users of other tenants (guests) that have been federated into the local tenant as host, while the outbound connections support similar guest entries 38 in the virtual directories 34-*x* of other tenants (hosts) into which users of the local tenant are federated as guests.

As shown, the access logic includes both a service provider (SP) component 40 and an identity provider (IdP) component 42, along with respective connections to the network 12, the service applications 14, the Tx portals 20-*x* of the other tenants, and a risk analysis system 44. The connection to network 12 provides for communication with the Tx users accessing the system (FIG. 1), and the connections to service applications 14 provide for communicating authentication results and access control information enabling invocation and use of the applications 14 by authorized and authenticated users. As described more below, both primary and secondary authentication schemes may be employed for guest tenant users. The primary authentication scheme uses the connections among the portals 20*x*, specifically between the SP 40 of each portal 20 and the IdP 42 of each other portal 20-*x*. A secondary authentication scheme, if used, may be a risk-based scheme using the risk analysis system 44.

In one embodiment a directory-based scheme may be used for identifying users and organizing their respective authentication and access control information. One known directory scheme used for similar purposes is Active Directory, and this may be adapted for use in the SaaS system 10. When a directory scheme is employed, the tenant identity store 32 may be realized as a directory, and the guest identity connector 34 as a virtual directory that mirrors the directory entries from the tenant directories of other tenants. In other embodiment, the guest identity connector 34 may be realized as a virtual directory with other store types used for the tenant identity stores 32, such as databases.

Figure 3:
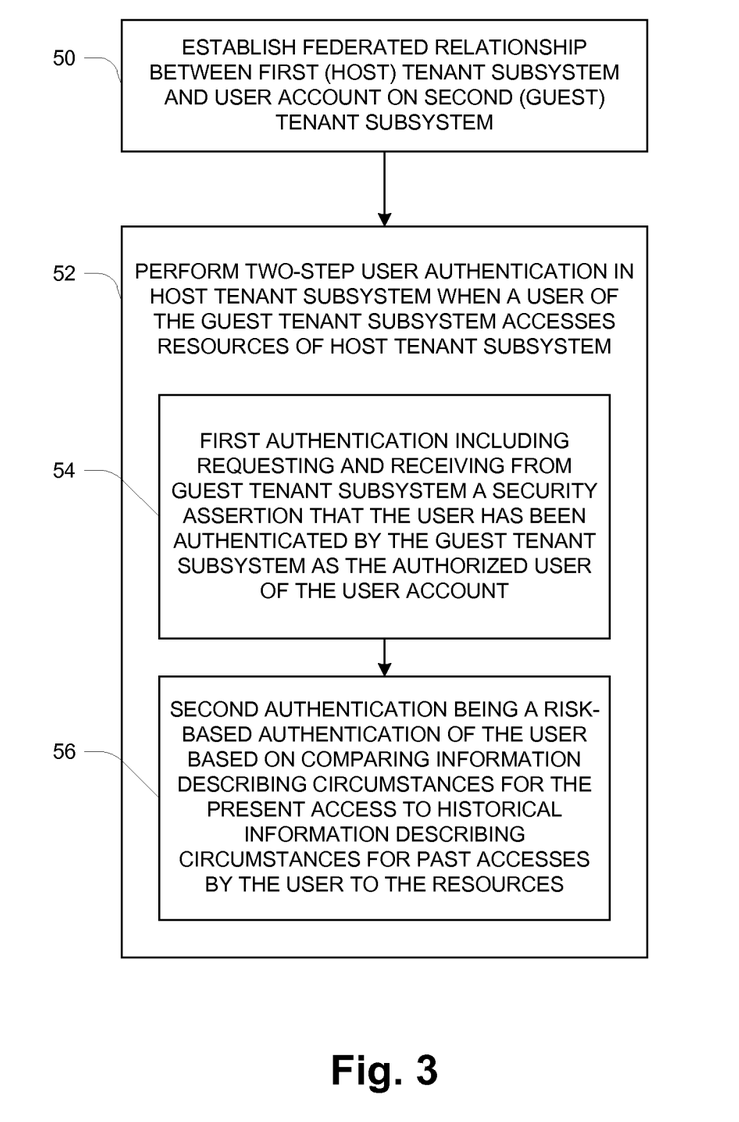
FIGS. 3 and 4 are flow diagrams of operations in a SaaS system.

FIG. 3 is a high-level flow diagram of operation of the SaaS system 10 with respect to federation of users. This process describes a two-step user authentication. At 50, a federated relationship is established between a first (i.e., host) tenant subsystem and a user account on a second (i.e., guest) tenant subsystem. The federated relationship includes visibility controls in the host tenant subsystem identifying the user account and specifying resources of the host tenant subsystem that are accessible to an authorized user of the user account in the guest tenant subsystem. This refers to the use of the guest entries 38 in the guest identity connector 34 as described above.

At 52 a two-step user authentication is performed in the host tenant subsystem when a user of the guest tenant subsystem accesses the resources. At 54 is a first authentication including requesting and receiving from the guest tenant subsystem a security assertion that the user has been authenticated by the second tenant subsystem as the authorized user of the user account. Details of this process are given below. At 56 is a second authentication which is a risk-based authentication of the user. Risk-based authentication techniques are generally known and not elaborated herein. Generally, the second authentication of 56 is based on comparing information that describes circumstances for the present access to historical information describing circumstances for past accesses by the user to the resources. Typical circumstances might include information about the location of the user, the timing of the access, characteristics of the user computer or other device by which the access is being made, etc. It will be appreciated that information obtained in this process is itself added to the history based of the risk analysis system 44 for use in subsequent risk-based authentications of this user. In one embodiment, the risk analysis system 44 may be an adaptive authentication system.

Figure 4:
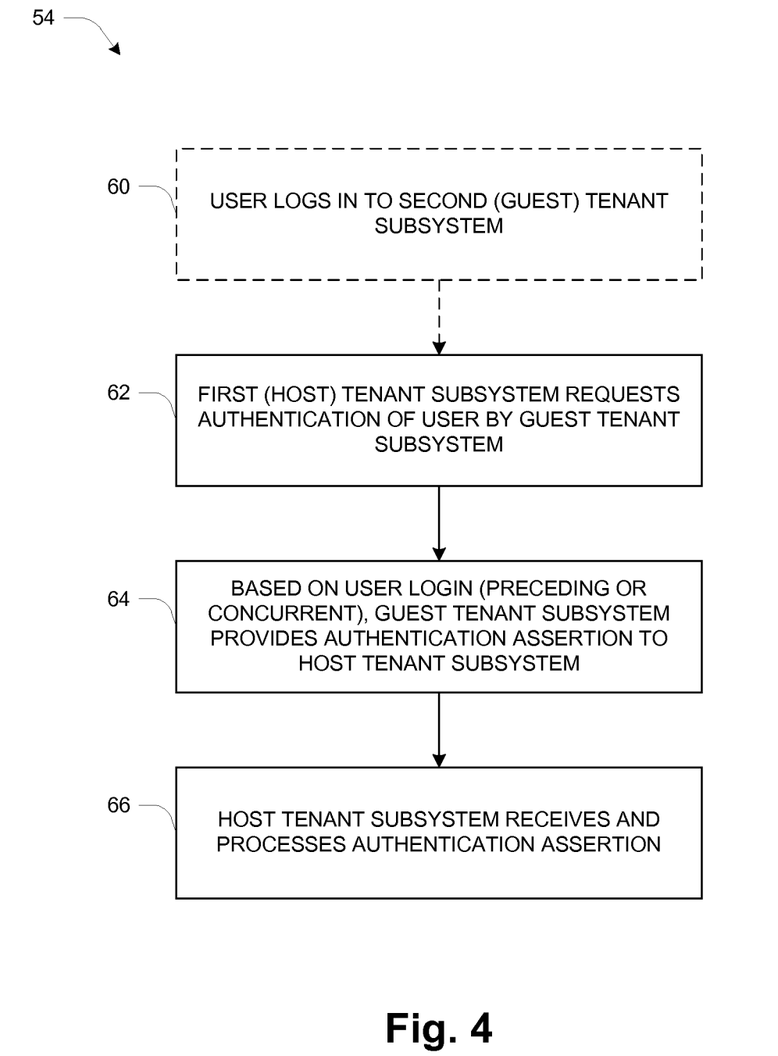

FIG. 4 shows details of the first authentication 54. It is assumed that there is a preceding or concurrent login operation by which the user is authenticated within the guest tenant system, as indicated by dotted box 60. It is important that each portal 20 enforce such local-tenant authentication in order to provide the assertions used for authenticating a user as a guest user in other tenant subsystems. At 62, the portal 20 of the host tenant subsystem identifies the user as a user of the guest tenant subsystem and requests an authentication of the user from the guest tenant subsystem (specifically from the portal 20 of the guest tenant subsystem). At 64, based on the preceding or concurrent user login 60, the guest tenant subsystem provides the request authentication assertion to the host tenant subsystem. At 66, the host tenant subsystem receives the authentication assertion and processes it as such, thereby confirming the authenticity of the user as a condition of providing access to the resources 18 of the host tenant subsystem.

In the process of FIG. 4, the actor in the host tenant subsystem is the SP 40 of the host portal 20, and the actor in the guest tenant subsystem is the IdP 42 of the guest portal 20. Thus in this process, the guest tenant subsystem functions as a trusted identity provider from the perspective of the host tenant subsystem seeking to authenticate the user. Known methods and protocols for such separate authentication include those specified as Security Assertion Markup Language or SAML. Other techniques, standardized or proprietary, may be employed.

While the process of FIG. 3 employs both primary and secondary, or two-step, authentication, in alternative embodiments it may be desirable to perform only the primary authentication that relies on a security assertion from a guest tenant as described above with reference to FIG. 4.

Figure 5:
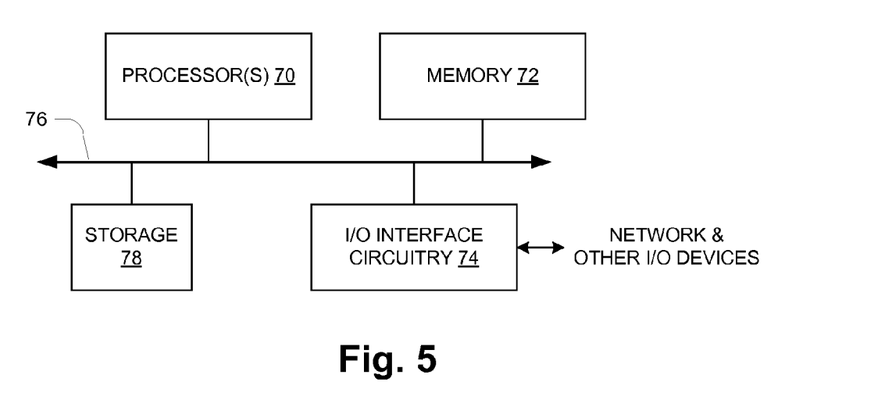
FIG. 5 is a block diagram of a computer from a hardware perspective.

The SaaS system 10 as described herein may be realized using a set of interconnected physical computers as generally known in the art. FIG. 5 shows an example configuration of a physical computer or controller from a computer hardware perspective. The hardware includes one or more processors 70, memory 72, and interface circuitry 74 interconnected by data interconnections 76 such as one or more high-speed data buses. The interface circuitry 74 provides a hardware connection to a network such as network 12 (FIG. 1) and perhaps other external devices/connections (EXT DEVs). The processor(s) 70 with connected memory 72 may also be referred to as "processing circuitry" herein. As mentioned, there may also be local storage 78 such as a local-attached disk drive or Flash drive. In operation, the memory 72 stores data and instructions of system software (e.g., operating system) and one or more application programs which are executed by the processor(s) 70 to cause the hardware to function in a software-defined manner. Thus the computer hardware executing instructions of an access control application, such as described herein, can be referred to as an access control circuit or access control component, and it will be understood that a collection of such circuits or components can all be realized and interact with each other as one or more sets of computer processing hardware executing different computer programs as generally known in the art.

While various embodiments of the invention have been particularly shown and described, it will be understood by those skilled in the art that various changes in form and details may be made therein without departing from the scope of the invention as defined by the appended claims.

What is claimed is:

1. A method of operating a computer system hosting a service application and multiple tenant subsystems having respective resources, the computer system including an access control subsystem capable of mutually isolating the tenant subsystems to prevent a given tenant from accessing the resources of another tenant, comprising:

establishing a federated relationship between a first tenant subsystem and a user account on a second tenant subsystem, the federated relationship including visibility controls in the first tenant subsystem identifying the user account and specifying resources of the first tenant subsystem that are accessible to an authorized user of the user account in the second tenant subsystem;

performing a user authentication in the first tenant subsystem when a user of the second tenant subsystem accesses the resources, the user authentication including requesting and receiving from the second tenant subsystem a security assertion that the user has been authenticated by the second tenant subsystem as the authorized user of the user account; and wherein each tenant subsystem includes a respective tenant identity store containing authentication information for user accounts of the respective tenant.

2. A method according to claim 1, wherein each tenant identity store further contains access control information for the user accounts of the respective tenant, and each tenant subsystem further includes a respective guest identity connector making users from other tenant identity stores visible to the respective tenant subsystem.

3. A method according to claim 2, wherein each tenant identity store is a directory.

4. A method according to claim 2, wherein each guest identity connector is a virtual directory and the tenant identity stores are databases.

5. A method according to claim 1, wherein the user authentication is a two-step user authentication in which the requesting and receiving are a first authentication, a second authentication of the two-step user authentication being a risk-based authentication of the user based on comparing information describing circumstances for the present access to historical information describing circumstances for past accesses by the user to the resources.

6. A method according to claim 4, wherein the risk-based authentication includes adaptive authentication.

7. A method according to claim 1, wherein the access control subsystem includes a set of tenant portals each providing user access to a respective tenant subsystem, each tenant portal including a service provider component and an identity provider component, the service provider component of each portal performing the requesting and receiving of security assertions from other tenant subsystems as part of authenticating a guest user into the tenant subsystem accessed via the portal, the identity provider component of each portal responding to the requesting of security assertions from the other tenant subsystems by providing the requested security assertions based on local authentication of a user as the authorized user of a user account of the tenant subsystem accessed via the portal.

8. A method according to claim 7, wherein the service provider component and identity provider component engage in the requesting and providing of security assertions according to a security assertion markup language protocol.

9. A method according to claim 1, further comprising:
wherein the tenant identity store for each tenant subsystem includes a tenant directory containing a plurality of user entries, each of the user entries containing authentication information and access control information specific to the tenant subsystem for a respective user of the tenant subsystem, and wherein the security assertion indicates that the user has been authenticated by the second tenant subsystem as the authorized user of the user account on the second tenant subsystem based on authentication information contained in an entry for the user in the tenant directory of the second tenant subsystem.

10. A method according to claim 9, wherein each tenant subsystem includes a virtual directory making users from other tenant subsystems visible from the tenant directories of the other tenant subsystems.

11. A computer system, comprising:
one or more processors;
memory;
input/output circuitry for coupling the computer system to local storage and to a network via which users access the computer system; and
one or more high-speed data buses interconnecting the processors, memory and input/output circuitry for data transfer there between,
the memory storing computer instructions and data of a service application, multiple tenant subsystems having respective resources in the local storage, wherein each tenant subsystem includes a respective tenant identity store containing authentication information for user accounts of the respective tenant, and an access control subsystem capable of mutually isolating the tenant subsystems to prevent a given tenant from accessing the resources of another tenant, the instructions being executable by the processors to cause the computer system to perform a method including:
establishing a federated relationship between a first tenant subsystem and a user account on a second tenant subsystem, the federated relationship including visibility controls in the first tenant subsystem identifying the user account and specifying resources of the first tenant subsystem that are accessible to an authorized user of the user account in the second tenant subsystem; and
performing a user authentication in the first tenant subsystem when a user of the second tenant subsystem accesses the resources, the user authentication including requesting and receiving from the second tenant subsystem a security assertion that the user has been authenticated by the second tenant subsystem as the authorized user of the user account.

12. A computer system according to claim 11, wherein each tenant identity store further contains access control information for the user accounts of the respective tenant, and each tenant subsystem further includes a respective guest identity connector making users from other tenant identity stores visible to the respective tenant subsystem.

13. A computer system according to claim 12, wherein each tenant identity store is a directory.

14. A computer system according to claim 12, wherein each guest identity connector is a virtual directory and the tenant identity stores are databases.

15. A computer system according to claim 11, wherein the user authentication is a two-step user authentication in which the requesting and receiving are a first authentication, a second authentication of the two-step user authentication being a risk-based authentication of the user based on comparing information describing circumstances for the present access to historical information describing circumstances for past accesses by the user to the resources.

16. A computer system according to claim 15, wherein the risk-based authentication includes adaptive authentication.

17. A computer system according to claim 11, wherein the access control subsystem includes a set of tenant portals each providing user access to a respective tenant subsystem, each tenant portal including a service provider component and an identity provider component, the service provider component of each portal performing the requesting and receiving of security assertions from other tenant subsystems as part of authenticating a guest user into the tenant subsystem accessed via the portal, the identity provider component of each portal responding to the requesting of security assertions from the other tenant subsystems by providing the requested security assertions based on local authentication of a user as the authorized user of a user account of the tenant subsystem accessed via the portal.

18. A computer system according to claim 17, wherein the service provider component and identity provider component engage in the requesting and providing of security assertions according to a security assertion markup language protocol.

19. A non-transitory computer-readable medium storing computer program instructions, the instructions being executable by a computer system to cause the computer system to host a service application, multiple tenant subsystems having respective resources, and an access control subsystem capable of mutually isolating the tenant subsystems to prevent a given tenant from accessing the resources of another tenant, the instructions further causing the computer system to perform a method including:

establishing a federated relationship between a first tenant subsystem and a user account on a second tenant subsystem, the federated relationship including visibility controls in the first tenant subsystem identifying the user account and specifying resources of the first tenant subsystem that are accessible to an authorized user of the user account in the second tenant subsystem;

performing a user authentication in the first tenant subsystem when a user of the second tenant subsystem accesses the resources, the user authentication including requesting and receiving from the second tenant subsystem a security assertion that the user has been authenticated by the second tenant subsystem as the authorized user of the user account; and wherein each tenant subsystem includes a respective tenant identity store containing authentication information for user accounts of the respective tenant.

20. A non-transitory computer-readable medium according to claim 19, wherein each tenant identity store further contains access control information for the user accounts of the respective tenant, and each tenant subsystem further includes a respective guest identity connector making users from other tenant identity stores visible to the respective tenant subsystem.

21. A non-transitory computer-readable medium according to claim 20, wherein each tenant identity store is a directory.

22. A non-transitory computer-readable medium according to claim 19, wherein the user authentication is a two-step user authentication in which the requesting and receiving are a first authentication, a second authentication of the two-step user authentication being a risk-based authentication of the user based on comparing information describing circumstances for the present access to historical information describing circumstances for past accesses by the user to the resources.

* * * * *